United States Patent
Landrieve

(10) Patent No.: US 11,371,562 B2
(45) Date of Patent: Jun. 28, 2022

(54) BEARING WITH DISTANCE MEASURING SYSTEM AND ASSOCIATED GROOVE

(71) Applicant: Aktiebolaget SKF, Gothenburg (SE)

(72) Inventor: Franck Landrieve, Fondettes (FR)

(73) Assignee: SKF Aerospace France S.A.S

(*) Notice: Subject to any disclaimer, the term of this patent is extended or adjusted under 35 U.S.C. 154(b) by 0 days.

(21) Appl. No.: 17/095,243

(22) Filed: Nov. 11, 2020

(65) Prior Publication Data

US 2021/0156421 A1 May 27, 2021

(30) Foreign Application Priority Data

Nov. 25, 2019 (DE) .......................... 102019218144.9

(51) Int. Cl.
| | |
|---|---|
| *F16C 41/00* | (2006.01) |
| *F16C 19/52* | (2006.01) |
| *F16C 19/38* | (2006.01) |
| *F16C 33/58* | (2006.01) |
| *F16C 17/24* | (2006.01) |

(52) U.S. Cl.
CPC ............ *F16C 41/00* (2013.01); *F16C 17/246* (2013.01); *F16C 19/381* (2013.01); *F16C 19/52* (2013.01); *F16C 2233/00* (2013.01)

(58) Field of Classification Search
CPC ...... F16C 17/246; F16C 19/52; F16C 19/381; F16C 33/58; F16C 41/00; F16C 41/007; F16C 2233/00

See application file for complete search history.

(56) References Cited

U.S. PATENT DOCUMENTS

| | | | |
|---|---|---|---|
| 7,733,083 B2 | 6/2010 | Ozaki | |
| 7,982,455 B2 | 7/2011 | Ito | |
| 9,863,477 B2 | 1/2018 | Mol | |
| 10,041,545 B2 | 8/2018 | Nicolas et al. | |
| 2002/0097040 A1 | 7/2002 | Takizawa | |
| 2006/0243150 A1 | 11/2006 | Landrieve | |
| 2009/0256551 A1 | 10/2009 | Ito et al. | |

FOREIGN PATENT DOCUMENTS

| | | |
|---|---|---|
| DE | 202012011902 U1 | 1/2013 |
| EP | 1528356 B1 | 1/2015 |
| FR | 2861458 A1 | 4/2005 |
| FR | 3041396 B1 | 3/2018 |
| WO | 2006100880 A1 | 9/2006 |
| WO | 2010028630 A1 | 3/2010 |
| WO | 2017222013 A1 | 12/2017 |

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

The bearing provides a first ring and a second ring capable of rotating concentrically relative to one another, at least one annular groove being formed on the second ring and oriented towards the first ring. The bearing further provides a measuring system mounted on the first ring, at least one guideway, at least one sliding carriage mounted on the guideway and axially moveable relative to the guideway, at least one sensor to detect axial positions of the sliding carriage relative to the guideway, an abutting element attached on the sliding carriage and coming into contact with at least one wall of the groove of the second ring at least in the axial direction, and a pre-stressing element to maintain the contact between the abutting element and the wall of the groove.

10 Claims, 2 Drawing Sheets

BEARING WITH DISTANCE MEASURING SYSTEM AND ASSOCIATED GROOVE

CROSS-REFERENCE TO RELATED APPLICATIONS

This application claims priority to German Patent Application no. 102019218144.9, filed Nov. 25, 2019, the contents of which is fully incorporated herein by reference.

TECHNICAL FIELD OF THE INVENTION

The present invention relates to the field of bearings. The invention notably relates to the field of large-diameter rolling bearings that can accommodate axial and radial loads, and having an inner ring and an outer ring arranged concentrically about an axis of rotation running in an axial direction.

BACKGROUND OF THE INVENTION

Such large-diameter rolling bearings may be used for example in a tunnel boring machine, in a mining extraction machine or in a wind turbine.

A large-diameter rolling bearing comprises two concentric inner and outer rings, and at least two rows of rolling elements, such as rollers, arranged between the rings. Such rolling bearings are generally loaded both axially and radially, often with relatively large loads. In this case, reference is made to an orientation roller bearing or slewing roller bearing.

As a result of heavy loads, parts of the rolling bearing, more particularly raceways of the rolling elements, wear out. The wear of the rings and rolling elements leads to a significant increase of the initial bearing clearance. The wear exceeding a certain value can lead to a dramatic bearing failure.

Measuring the wear of the bearing through the clearance increase causing relative axial and radial displacement of the rings helps to predict bearing's residual life.

Such unwanted movements affect to proper functioning of the bearing and the application, with the risk that the bearing rings come in contact and collide. Other elements attached to the bearing rings may also collide.

It is common to replace the bearings when they are worn out. Such maintenance interventions are expensive, especially because of the downtime need for the machines or facilities. It is therefore desirable that such maintenance interventions are timely performed before any contact between the bearing rings, but not too early too.

In order to monitor the bearing condition during its service life, the rolling bearing disclosed in patent application FR041396A1 comprises an annular magnetic target fixed to the inner ring, and a sensor mounted on the outer ring and facing the magnetic target. Accordingly, axial and angular relative movements between the inner and outer rings can be detected.

However, this requires the installation of the annular magnetic target on the inner ring that can be several meters diameters.

Reference can also be made to the rolling bearing disclosed in patent U.S. Pat. No. 10,041,545B2 and comprising an encoder provided with a magnetic strip portion attached in a flat manner against the outer ring and cooperating with a sensor fixed to the inner ring.

However, with such arrangement, it is not possible to measure the axial relative movements between the inner and outer rings regardless the rotational position of the rings, but only when the outer ring is on a rotational position with the magnetic strip portion in front of the sensor of the inner ring.

Besides, with the use of such magnetic targets as disclosed in the above-mentioned documents, measuring of the axial displacement between the inner and outer rings is affected by the radial one. As a matter of fact, when measuring axial displacement of a magnetic target, the airgap between target and sensor varies with the radial relative movement between the rings making measure less accurate or even impossible.

One aim of the present invention is to overcome these drawbacks.

SUMMARY OF THE INVENTION

The invention relates to a bearing comprising a first ring and a second ring capable of rotating concentrically relative to one another.

According to a general feature, at least one annular groove is formed on the second ring and oriented towards the first ring.

According to another general feature, the bearing further comprises at least one measuring system mounted on the first ring and comprising:

at least one guideway, at least one sliding carriage mounted on the guideway and axially moveable relative to the guideway, at least one sensor disposed on one of the sliding carriage and guideway and adapted to detect axial positions of the sliding carriage relative to the guideway, an abutting element attached on the sliding carriage and coming into contact with at least one wall of the groove of the second ring at least in the axial direction, and a pre-stressing element to maintain the contact between the abutting element and the wall of the groove.

The pre-stressing element exerts a permanent force to ensure the contact with the abutting element and the wall of the groove.

The wall of the groove may be a side wall, or any other wall or portion of the groove which is inclined with respect to the axis of the bearing.

Thanks to the invention, an axial relative displacement between the rings can be accurately detected regardless the rotational position of the rings. As a matter of fact, axial position of the sliding carriage, which axially moves together with the abutting element in contact against the groove of the second ring, is detected by the sensor. Besides, there is no need to mount an annular magnetic target on one of the rings. The groove may be easily machined on the associated ring.

Advantageously, the first ring comprises a radial hole radially facing the groove of the second ring and inside which the measuring system is partly disposed. The hole may extend radially from an axial cylindrical surface of the first ring radially facing the second ring, and opens on an opposite axial cylindrical surface located radially on the side opposite to the second ring. Accordingly, the measuring system is inserted into the through-hole and arranged in its final position in an easy way. The first ring may further comprise a plug sealing the hole.

In one embodiment, the guideway of the measuring system is secured to the first ring. In this case, the pre-stressing element may be axially disposed between the guideway and the sliding carriage.

In an alternative embodiment, the measuring system may comprise:

a first guideway secured to the first ring and a first sliding carriage mounted on the first guideway and radially moveable relative to the first guideway, a first sensor disposed on one of the first sliding carriage and guideway and adapted to detect radial positions of the first sliding carriage relative to the first guideway, a second guideway secured to the first sliding carriage and a second sliding carriage mounted on the second guideway and axially moveable relative to the second guideway, and a second sensor disposed on one of the second sliding carriage and guideway and adapted to detect axial positions of the second sliding carriage relative to the second guideway, the abutting element being attached on the second sliding carriage.

With this embodiment, an axial relative displacement between the rings can be detected with the axial position of the second sliding carriage supporting the abutting element. Besides, a radial relative displacement between the rings can also be detected with the radial position of the first sliding carriage supporting the second sliding carriage.

The pre-stressing element may be radially disposed between the first guideway and the first sliding carriage.

In this embodiment, the abutting element may comprise a tapered roller engaging into the groove of the second ring, the groove having a complementary tapered shape.

In one embodiment, the bearing further comprises at least one row of rolling elements arranged between raceways provided on the first and second rings.

The bearing further may comprise first and second seals disposed between the first and second rings and delimiting together a closed rolling space inside which the row of rolling elements and at least a part of the measuring system are housed.

In one embodiment, the bearing may further comprise at least one additional seal located inside the closed rolling space and delimiting together with one of the first and second seals a closed detection space inside which opens the groove.

In one embodiment, the bearing comprises at least one row of axial rolling elements arranged between radial raceways provided on the rings, and at least one row of radial rolling elements arranged between axial raceways provided on the rings, the second ring comprising a protruding nose engaged into an annular groove of the first ring and which protrudes radially from an axial cylindrical surface of the second ring, the groove being formed onto the axial cylindrical surface.

The terms "axial rolling elements" is understood to mean rolling elements adapted to accommodate axial loads whereas the terms "radial rolling elements" is understood to mean rolling elements adapted to accommodate radial loads.

The nose of the second ring may be further provided with two opposite radial flanks delimiting axially the axial cylindrical surface, one of the radial flanks delimiting at least partly the radial raceway of the second ring.

In one embodiment, the bearing comprises at least two rows of axial rolling elements each arranged between radial raceways provided on the rings, the two rows of axial rolling elements being disposed axially on each side of the nose of the second ring.

In one embodiment, the sensor(s) may be a proximity sensor, notably an inductive sensor, an ultrasonic sensor or an optical sensor.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
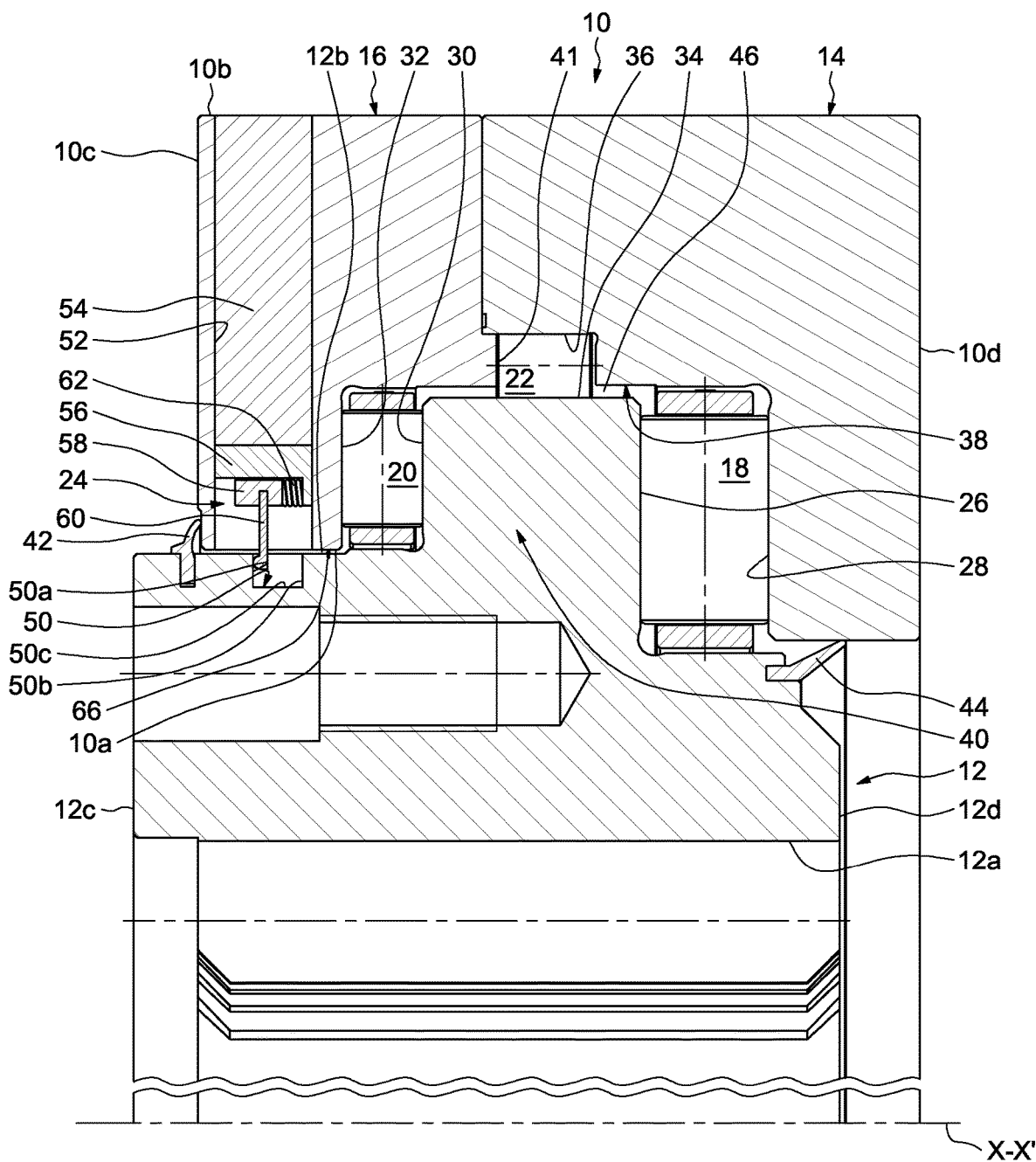
FIG. 1 is a partial cross-section of a rolling bearing according to a first example of the invention.

The rolling bearing as illustrated on FIG. 1 is a large-diameter rolling bearing comprising a first ring 10 and a second ring 12. In the illustrated example, the first ring 10 is the outer ring whereas the second ring 12 is the inner ring. The rolling bearing may for example be used in a tunnel boring machine, a wind turbine or any other applications using a large diameter rolling bearing.

The outer and inner rings 10, 12 are concentric and extend axially along the bearing rotation axis X-X' which runs in an axial direction. The rings 10, 12 are of the solid type.

The outer ring 10 is formed as a split ring and comprises a first ring 14 and a second ring 16 stacked one relative to the other in the axial direction. Each of the first and second rings 14, 16 of the outer ring is provided with a plurality of aligned through-holes (not shown) in order to be joined by fitting bolts.

In the illustrated example, the rolling bearing comprises two rows of axial rollers 18, 20 which are arranged between the outer and inner rings 10, 12 in order to form an axial thrust, and a row of radial rollers 22 which are arranged between the rings to form a radial thrust.

As will be described later, the rolling bearing also comprises a distance measuring system 24 for detecting an axial relative displacement between the outer and inner rings 10, 12. In the illustrated example, the measuring system 24 is mounted on the outer ring 10.

The rollers 18, 20, 22 of one row are identical to one another. Each roller 18, 20, 22 comprises a cylindrical outer rolling surface and two opposite frontal end surfaces delimiting the outer rolling surface. The axis of rotation of each roller 22 is parallel to the axis X-X' of the bearing and perpendicular to the axes of each or the rollers 18, 20. In the illustrated example, the axial length of the rollers 18 is larger than the one of the rollers 20. Alternatively, the axial length of the rollers 18 may be smaller than, or may be equal to, the one of the rollers 20.

The rollers 18 are arranged axially between annular radial raceways 26, 28 respectively formed on the inner and outer rings 12, 10. Each radial raceway 26, 28 has in cross section a straight internal profile in contact with the rolling surfaces of the rollers 18. The raceways 26, 28 face each other in the axial direction.

The rollers 20 are arranged axially between annular radial raceways 30, 32 respectively formed on the inner and outer rings 12, 10. Each radial raceway 30, 32 has in cross section a straight internal profile in contact with the rolling surfaces of the rollers 20. The raceways 30, 32 axially face each other. The rows of rollers 18, 20 are spaced apart from each other in the axial direction.

The rollers 22 are arranged radially between annular axial raceways 34, 36 respectively formed on the inner and outer rings 12, 10. Each axial raceway 34, 36 has in cross section a straight internal profile in contact with the rolling surfaces of the rollers 22. The raceways 34, 36 face each other in the radial direction. The row of rollers 22 is radially offset outwards with respect to the rows of rollers 18, 20. The row of rollers 22 is axially located between the rows of rollers 18, 20.

The outer ring 10 comprises an annular groove 38 opening in a radial direction inwardly towards the inner ring 12. The outer ring 10 comprises an inner stepped cylindrical surface or bore 10*a* from which the groove 38 is formed. The outer ring 10 also comprises an outer cylindrical surface 10*b* which is radially opposite to the bore 10*a*. The outer ring 10 further comprises two opposite radial frontal surfaces 10*c*, 10*d* which axially delimit the bore 10*a* and the outer surface 10*b* of the ring.

The inner ring 12 comprises an annular protruding nose 40 engaging into the annular groove 38 of the outer ring. The nose 40 extends radially outwards.

The inner ring 12 comprises an inner cylindrical bore 12*a* and a stepped outer cylindrical surface 12*b* which is radially opposite to the bore 12*a*. In the illustrated example, the bore 12*a* of the inner ring is provided with a gear teeth (not referenced). The inner ring 12 further comprises two opposite radial frontal surfaces 12*c*, 12*d* which axially delimit the bore 12*a* and the outer cylindrical surface 12*b*. The protruding nose 40 protrudes radially from the outer cylindrical surface 12*b*.

The rows of rollers 18, 20 are arranged axially between the nose 40 of the inner ring and the groove 38 of the outer ring. The rows of rollers 18, 20 are disposed on each side of the nose 40 of the inner ring. The radial raceway 26 is located on the nose 40 and on a radial portion of the outer stepped cylindrical surface 12*b* of the inner ring. Alternatively, the radial raceway 26 may be completely located on the nose 40. The radial raceway 30 is located on the nose 40. The radial raceways 28, 32 are located on the groove 38 of the outer ring.

More precisely, a first radial flank of the nose 40 partly delimits the radial raceway 26 for the rollers 18. A first radial flank of the groove 38, which axially faces the first radial flank of the nose 40, delimits the radial raceway 28 for the rollers 18. A second flank of the nose 40 and a facing second flank of the groove 38 respectively delimits the radial raceways 30, 32 for the rollers 20. The opposite first and second flanks of the nose 40 delimit axially the nose. Similarly, the opposite first and second flanks of the groove 38 delimit axially the groove. Each of the first and second flanks of the nose 40 extends radially the outer cylindrical surface 12*b* of the inner ring.

The row of rollers 22 is arranged radially between the nose 40 of the inner ring and the groove 38 of the outer ring. The axial raceways 34, 36 are respectively located on the nose 40 and the groove 38. An outer cylindrical surface of the nose 40 delimits the axial raceway 34. The outer cylindrical surface of the nose 40 and the outer cylindrical surface 12*b* are radially offset. As a result, the axial raceway 34 and the outer cylindrical surface 12*b* are also radially offset. The outer cylindrical surface of the nose 40 extends axially between the opposite radial flanks of the nose.

An axial bottom of the groove 38 delimits the axial raceway 36. In the illustrated example, an annular slot 41 is formed in the bottom of the groove 38 and delimits the axial raceway 36. The axial raceway 36 radially faces the outer cylindrical surface of the nose 40 onto which is formed the axial raceway 34.

In the illustrated example, the inner ring 12 is made in one part. Alternatively, the inner ring 12 may be divided in the axial direction in at least two separate parts secured together. In another variant, the nose 40 may be made separately from the main part of the inner ring.

As previously mentioned, the outer ring 10 is divided in the axial direction in two separate parts, the first ring 14 and the second ring 16. The first and second rings 14, 16 delimit together the groove 38. The radial raceway 28 is located on the first ring 14 and the radial raceway 32 is located on the second ring 16 of the outer ring.

The rolling bearing further comprises on each side an annular seal 42, 44 mounted on the inner ring 12 and provided to close the radial space that exists between the rings 10, 12. This radial space is defined between the bore 10*a* of the outer ring, and the outer cylindrical surface 12*b* and the outer surface of the nose 40 of the inner ring.

A closed space 46 is defined between the inner and outer ring 12, 14 and the seals 42, 44 in which the rows of rolling elements 18, 20 and 22, and the sensor 24 are housed.

Each seal 42, 44 is mounted into a groove (not referenced) formed on the outer cylindrical surface 12*b* of the inner ring and comes into contact with the outer ring 10. The seal 42 comes into contact with the radial frontal surface 10*c* of the outer ring. The seal 44 comes into contact with the bore 10*a* of the outer ring axially near the row of rollers 18. Alternatively, it could be possible to provide a reversed arrangement for at least one of the seals 42, 44 with the seal mounted on the outer ring 10 and coming into friction contact with the inner ring 12.

As previously mentioned, the measuring system 24 is provided to detect an axial relative displacement between the outer and inner rings 10, 12. To this end, an annular groove 50 is also formed on the inner ring 12.

In the illustrated example, the groove 50 is formed on the outer cylindrical surface 12*b* of the inner ring. The groove 50 extends radially inwards from the outer cylindrical surface 12*b*. The groove 50 is axially delimited by two annular side edges or walls 50*a*, 50*b*. The side walls 50*a*, 50*c* axially face each other. The side walls 50*a*, 50*c* are axially spaced apart from each other. The groove 50 also comprises an annular bottom 50*c* connected to the side walls 50*a*, 50*b*. The outer cylindrical surface 12*b* of the inner ring and the bottom 50*c* of the groove are radially offset.

In the illustrated example, the side walls 50*a*, 50*b* of the groove extend radially and the bottom 50*c* extends axially. The groove 50 has a rectangular shape in cross-section. Alternatively, the groove may comprise an annular tapered bottom connected to the side walls.

The outer ring 10 is provided with a radial through-hole 52 inside which the measuring system 24 is located. The through-hole 52 extends from the bore 10*a* of the outer ring and opens on the outer surface 10*b*. The through-hole 52 radially faces the groove 50 of the inner ring.

The outer ring 10 further comprises a plug 54 which closes and seals the through-hole 52. The plug 54 is located radially into the through-hole 52. The plug 54 is secured inside the through-hole 52 by any appropriate means, for example by force-fitting. The plug 54 is flush with the outer cylindrical surface 10*b* of the outer ring.

The measuring system 24 comprises a guideway 56 secured to the outer ring 10, a sliding carriage 58 which is axially slidably mounted on the guideway, and a sensor (not visible) to detect axial positions of the carriage 58 relative to the guideway 56.

The sensor is integrated into the carriage 58. The sensor may be an optical sensor. The guideway 56 has a track which is coded in the axial direction and oriented towards the sensor. The track may be encoded in the axial direction with successive marks, such as an incremental track. Alternatively, it is possible to foresee a reverse disposition with the sensor on the guideway 56 and the track on the carriage 58.

The sensor is connected to a control unit (not shown) of the rolling bearing so as to transmit sensed measurements.

The measuring system 24 also comprises a contact stylus 60 secured to the sliding carriage 58. The stylus 60 may be secured to the sliding carriage 58 by any appropriate means.

The stylus 60 protrudes radially into the groove 50 of the inner ring. The stylus 60 extends from the sliding carriage 58 and is partly located inside the hole 52 of the outer ring. The stylus 60 extends radially inwards. The stylus 60 axially comes into contact with the side wall 50a of the groove. In the illustrated example, the stylus 60 is provided with a rounded free end to reduce the friction with the inner ring 12 when the inner ring rotates. Alternatively, the stylus 60 may have other shape to axially come into contact with the side wall 50a of the groove.

The measuring system 24 further comprises a spring 62 to always maintain the axial contact between the stylus 60 and the side wall 50a of the groove.

In this example, the spring 62 is axially interposed between the carriage 58 and the guideway 56. The spring 62 exerts an axial pre-stressing permanent force on the carriage 58 so as to ensure a constant contact between the stylus 60 and the side wall 50a of the groove. The spring 62 acts as a pre-stressing element. A first end of the spring 62 bears against the guideway 56 and the opposite second end bears against the carriage 58. In the illustrated example, the spring 62 is a compression spring. Alternatively, it could be possible to provide other pre-stressing element to exert a permanent force on the carriage 58, for example an elastic washer, such as a Belleville washer.

The guideway 56 is secured inside the through-hole 52 of the outer ring by any appropriate means, for example by force-fitting. The guideway 56 may be secured to the hole 52 or to the plug 54. The guideway 56 is entirely located inside the hole 52.

The carriage 58 is located inside the through-hole 52 of the outer ring. The carriage 58 is slidably mounted on the guideway 60 in the axial direction. For example, the carriage 58 and the guideway 60 may be of the same type of construction as those of the Minislide MSQ measuring system commercialized by Schneeberger.

When an axial displacement of the inner ring 12 relative to the outer rings occurs, this results in a corresponding axial displacement of the stylus 60 of the measuring system. The carriage 58 axially moves together with the stylus 60 relative to the guideway 56. The axial displacement of the carriage 58 is detected by the integrated sensor.

The control unit connected to the sensor of the measuring system 24 calculates the corresponding value of the axial displacement of the inner ring 12 relative to the outer ring 10.

In the illustrated example, the rolling bearing further comprises an additional seal 66 disposed inside the closed space 46 which is delimited by the seals 42, 44. The seal 66 is axially located near to the seal 42. The seal 66 is axially disposed between the seal 42 and the row of axial rollers 20. In the illustrated example, the seal 66 is mounted into a groove (not referenced) formed on the outer cylindrical surface 12b of the inner ring and comes into contact with the outer ring 10. The seal 66 comes into contact with the bore 10a of the outer ring near to the hole 52. Alternatively, the seal 66 may be mounted on the outer ring 14 and come into friction contact with the inner ring 12.

Radially between the outer and inner rings 10 and 12, the seal 66 delimits together with the seal 42 a closed detection space (not referenced) inside which open the groove 50 of the inner ring and the hole 52 of the outer ring. Only the groove 50, the hole 52 and the measuring system 24 are located inside the detection space. There is no row of rollers inside the detection space. This reduces the risk that pollution, such as grease, dust, water, reaches the sensor of the measuring system 24.

Figure 2:
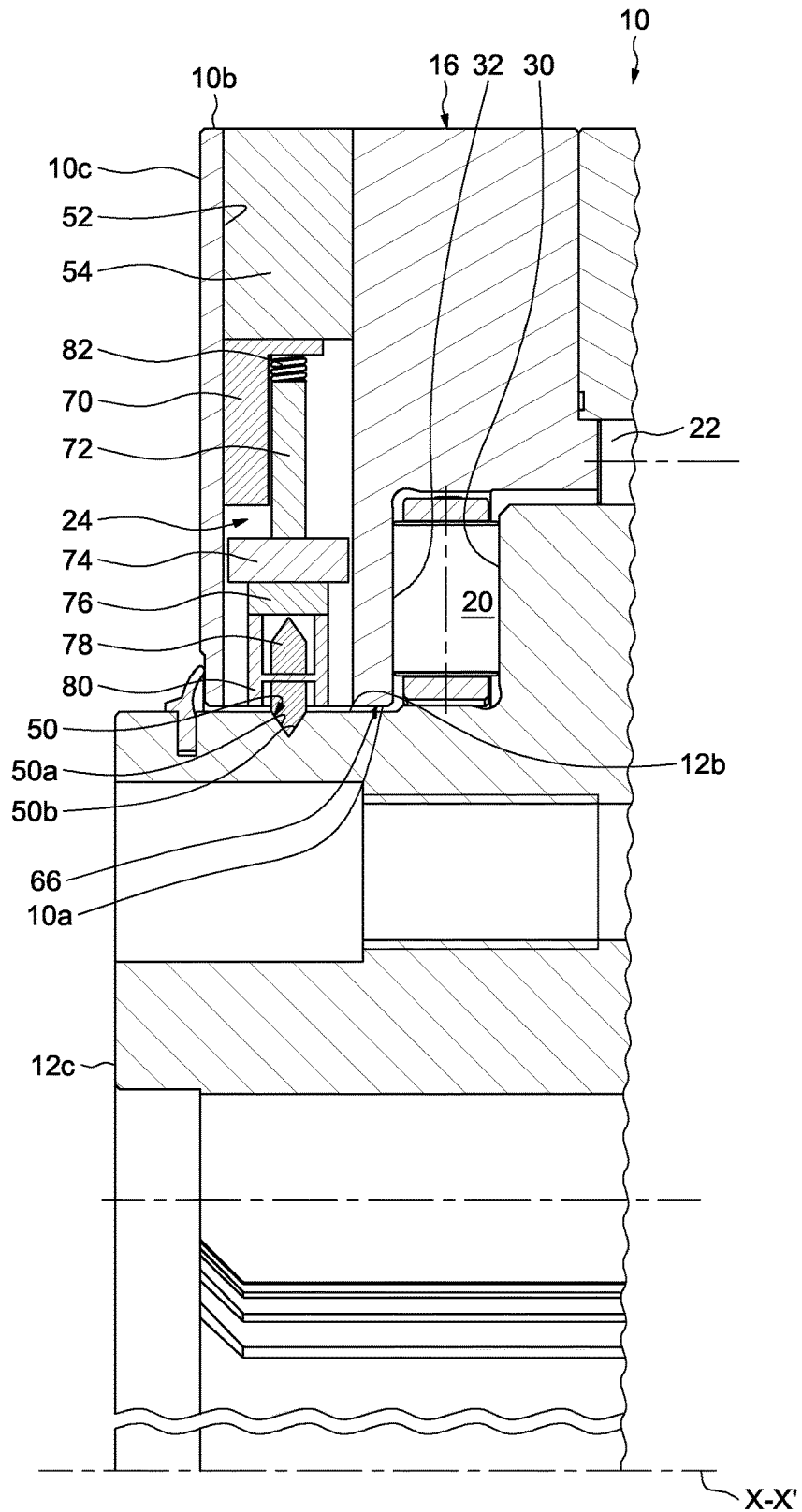
FIG. 2 is a partial cross-section of a rolling bearing according to a second example of the invention.

In the example shown on FIG. 2, in which identical parts are given identical references, the design of the measuring system 24 differs from the one of the first example.

The measuring system 24 comprises a first guideway 70 secured to the outer ring 10, a first sliding carriage 72 which is radially slidably mounted on the guideway, and a first sensor (not visible) to detect radial positions of the carriage 72 relative to the guideway 70. The sensor is integrated into the carriage 72 or the guideway 70 as described in the first example. The guideway 70 is secured inside the through-hole 52 of the outer ring. The guideway 70 may be secured to the hole 52 or to the plug 54. The carriage 72 is slidably mounted on the guideway 70 in the radial direction.

The measuring system 24 also comprises a second guideway 74, a second sliding carriage 76 which is axially slidably mounted on the guideway, and a second sensor (not visible) to detect axial positions of the carriage 76 relative to the guideway 74. The second guideway 74 is secured to the first carriage 72. The carriage 76 is slidably mounted on the second guideway 74 in the axial direction.

The measuring system 24 further comprises a contact roller 78 attached on the second sliding carriage 76. The measuring system 24 also comprises a bearing 80 to attach the roller 78 on the sliding carriage 76.

The axis of rotation of the roller 78 extends axially, i.e. parallel to the axis X-X' of the bearing. The roller 78 is partly located inside the hole 52 of the outer ring. The roller 78 protrudes radially into the groove 50 of the inner ring. The outer surface of the roller has a tapered shape complementary to the groove 50.

In this example, the groove 50 has a V-shaped cross-section. The side walls 50a, 50c of the groove extend obliquely. In this example, the tapered groove 50 is deprived of cylindrical bottom. Alternatively, the groove 50 may be provided with cylindrical bottom. The roller 78 comes into contact with the side walls 50a, 50b of the groove in the axial and radial directions.

The measuring system 24 also comprises a spring 82 to always maintain contact between the roller 78 and the side walls 50a, 50b of the groove in the axial and radial directions. In this example, the spring 82 is radially interposed between the first guideway 70 and the first sliding carriage 72.

The spring 82 exerts a radial pre-stressing permanent force on the carriage 72 so as to ensure a constant contact between the roller 78 and the side walls 50a, 50b of the groove. The spring 82 acts as a pre-stressing element. A first end of the spring 82 bears against the guideway 70 and the opposite second end bears against the carriage 72. In the illustrated example, the spring 82 is a compression spring. Alternatively, it could be possible to provide other pre-stressing element to exert a permanent force on the carriage 72, for example an elastic washer, such as a Belleville washer.

When an axial displacement of the inner ring 12 relative to the outer rings occurs, this results in a corresponding axial displacement of the roller 78 and the second carriage 76 relative to second guideway 74 of the measuring system, which is detected by the second sensor.

When a radial displacement of the inner ring 12 relative to the outer rings occurs, this results in a corresponding radial displacement of the roller 78, the second carriage 76, the second guideway 74 and the first carriage 72 relative to first guideway 70 of the measuring system. The radial displacement of the first carriage 72 relative to first guideway 70 is detected by the first sensor.

In the illustrated examples, the groove 50 is formed on the outer cylindrical surface 12b of the inner ring axially between the row of axial rollers 20 and the seal 42. Alternatively, according to the design of the rolling bearing, it could be possible to provide the groove 50 on another zone of the outer cylindrical surface 12b, or on the outer cylindrical surface of the nose 40 of the inner ring onto which is formed the axial raceway 34. In this last case, the measuring system 24 is axially located between the row of radial rollers 22 and the row of axial rollers 20 or 18.

Otherwise, as previously mentioned, in these illustrated examples, the first ring of the rolling bearing is the outer ring 10 whereas the second ring is the inner ring 12.

As an alternative, it could be possible to provide a reversed arrangement with the first ring forming the inner ring and the second ring forming the outer ring. In this case, the groove 50 is formed on the axial inner cylindrical surface of the outer ring, which forms the bore of the outer ring, and the measuring system 24 is mounted on the inner ring.

In the described examples, the rolling bearing is provided with three rows of rolling elements. Alternatively, the rolling bearing may comprise only one row of rolling elements, or two rows of rolling elements, or four or more rows of rolling elements. In the illustrated example, the rolling elements are rollers. The rolling bearing may comprise other types of rolling elements, for example balls. In another variant, the bearing may also be a sliding bearing having no rolling elements.

The invention claimed is:

1. A bearing comprising:
   a first ring and a second ring capable of rotating concentrically relative to one another,
   at least one annular groove formed on the second ring and oriented towards the first ring,
   at least one measuring system mounted on the first ring and comprising:
   at least one guideway,
   at least one sliding carriage mounted on the guideway and axially moveable relative to the guideway,
   at least one sensor disposed on one of the sliding carriage and guideway and adapted to detect axial positions of the sliding carriage relative to the guideway,
   an abutting element attached on the sliding carriage and coming into contact with at least one wall of the groove of the second ring at least in the axial direction, and
   a pre-stressing element to maintain the contact between the abutting element and the wall of the groove.

2. The bearing according to claim 1, wherein the first ring comprises a radial hole radially facing the groove of the second ring and inside which the measuring system is partly disposed.

3. The bearing according to claim 2, wherein the hole of the first ring extends radially from an axial cylindrical surface of the first ring radially facing the second ring, and opens on an opposite axial cylindrical surface located radially on the side opposite to the second ring.

4. The bearing according to claim 1, wherein the guideway of the measuring system is secured to the first ring.

5. The bearing according to claim 4, wherein the pre-stressing element is axially disposed between the guideway and the sliding carriage.

6. The bearing according to claim 1, wherein the measuring system comprises:
   a first guideway of the at least one guideway secured to the first ring and a first sliding carriage of the at least one sliding carriage mounted on the first guideway and radially moveable relative to the first guideway,
   a first sensor of the at least one sensor disposed on one of the first sliding carriage and guideway and adapted to detect radial positions of the first sliding carriage relative to the first guideway,
   a second guideway of the at least one guideway secured to the first sliding carriage and a second sliding carriage of the at least one sliding carriage mounted on the second guideway and axially moveable relative to the second guideway, and
   a second sensor of the at least one sensor disposed on one of the second sliding carriage and guideway and adapted to detect axial positions of the second sliding carriage relative to the second guideway,
   the abutting element being attached on the second sliding carriage.

7. The bearing according to claim 6, wherein the pre-stressing element is radially disposed between the first guideway and the first sliding carriage.

8. The bearing according to claim 6, wherein the abutting element comprises a tapered roller engaging into the groove of the second ring, the groove having a complementary tapered shape.

9. The bearing according to claim 1, further comprising at least one row of rolling elements arranged between raceways provided on the first and second rings.

10. The bearing according to claim 1, comprising at least one row of axial rolling elements arranged between radial raceways provided on the rings, and at least one row of radial rolling elements arranged between axial raceways provided on the rings, the second ring comprising a protruding nose engaged into an annular groove of the first ring and which protrudes radially from an axial cylindrical surface of the second ring, the groove being formed onto the axial cylindrical surface.

* * * * *